(12) United States Patent
Bailey

(10) Patent No.: US 10,451,196 B2
(45) Date of Patent: Oct. 22, 2019

(54) METHOD FOR DRAINING A FLUID-TRANSPORTING UNDERWATER PIPE WHICH IS SUBMERGED AND FILLED WITH WATER

(71) Applicant: SAIPEM S.A., Montigny le Bretonneux (FR)

(72) Inventor: Alexandre Bailey, Velizy Villacoublay (FR)

(73) Assignee: Saipem S.A., Montigny le Bretonneux (FR)

( * ) Notice: Subject to any disclaimer, the term of this patent is extended or adjusted under 35 U.S.C. 154(b) by 0 days.

(21) Appl. No.: 15/771,059

(22) PCT Filed: Sep. 28, 2016

(86) PCT No.: PCT/FR2016/052463
§ 371 (c)(1),
(2) Date: Apr. 25, 2018

(87) PCT Pub. No.: WO2017/072424
PCT Pub. Date: May 4, 2017

(65) Prior Publication Data
US 2018/0313466 A1    Nov. 1, 2018

(30) Foreign Application Priority Data

Oct. 26, 2015    (FR) ..................................... 15 60192

(51) Int. Cl.
*F16L 1/12* (2006.01)
*B08B 9/032* (2006.01)
*F16L 1/16* (2006.01)

(52) U.S. Cl.
CPC .............. *F16L 1/12* (2013.01); *B08B 9/0328* (2013.01); *F16L 1/166* (2013.01)

(58) Field of Classification Search
CPC ............ F16L 1/12; F16L 1/166; B08B 9/0328
See application file for complete search history.

(56) References Cited

U.S. PATENT DOCUMENTS

| 3,961,493 A * | 6/1976 | Nolan, Jr. ............... F16L 1/166 405/158 |
| 6,454,492 B1 * | 9/2002 | Dean ..................... B08B 9/0551 15/104.5 |
| 2007/0003371 A1 | 1/2007 | Yemington |

(Continued)

FOREIGN PATENT DOCUMENTS

| GB | 2 340 198 | 2/2000 |
| WO | WO 03/002403 | 1/2003 |
| WO | WO 2008/100943 | 8/2008 |

*Primary Examiner* — Benjamin F Fiorello
(74) *Attorney, Agent, or Firm* — Cozen O'Connor

(57) ABSTRACT

The invention provides a method of emptying an undersea fluid transport pipe (2) that is submerged and full of water, the method comprising pumping out at least a portion of the water present inside the submerged pipe by means of a submersible pump unit (6) connected to a point of the pipe, the volume of water pumped out from the inside of the pipe being compensated by a gas injected under pressure into the submerged pipe from a point (18) thereof that is situated higher than the connection point (12; 14) to the submersible pump unit. The invention also provides an installation for performing such a method.

8 Claims, 3 Drawing Sheets

(56) References Cited

U.S. PATENT DOCUMENTS

2010/0025043 A1\* 2/2010 Ingebrigtsen ......... B63B 25/082
  166/339
2010/0252260 A1\* 10/2010 Fowler ..................... F17D 1/17
  166/275

\* cited by examiner

METHOD FOR DRAINING A FLUID-TRANSPORTING UNDERWATER PIPE WHICH IS SUBMERGED AND FILLED WITH WATER

PRIORITY CLAIM

This is a U.S. national stage of application No. PCT/FR2016/052463, filed on Sep. 28, 2016. Priority is claimed on French application No. FR1560192, filed Oct. 26, 2015, the content of which is incorporated here by reference.

BACKGROUND OF THE INVENTION

The present invention relates to the general field of undersea pipes resting on the sea bed or providing a bottom-to-surface connection for transferring hydrocarbons (or any type of fluid used in the production of such hydrocarbons), in particular for transporting or injecting gas.

The invention relates more particularly to a method serving to empty undersea pipes resting on the sea bottom and that have been subjected either to various tests prior to being commissioned, or else to preservation prior to being abandoned temporarily on the sea bed for a longer or shorter length of time, which involves filling them with fresh water or sea water.

Undersea pipes for transporting hydrocarbons, in particular gas, need to be subjected to several tests prior to commissioning them. Typically, these pre-commissioning operations combine operations of filling (with fresh water or sea water), of cleaning, of calibration, of tests under pressure, of leak testing, of emptying, of drying, of filling with nitrogen, etc. In particular, during those operations, the pipes are filled with sea water or fresh water, in particular in order to test that they are leaktight and can withstand pressure, or indeed to preserve them over the long term. Once those tests or preservation operations have been undertaken, it becomes necessary to empty the underwater pipes of the test or preservation water they contain in order to put them into production or to recover an end thereof on the sea bottom so as to continue installing them.

In general, the operation of emptying pipes while underwater is performed from a surface structure, e.g. a floating production storage and offloading (FPSO) unit, a stationary platform, or a construction ship dedicated to this operation. For these operations, the surface structure has deployed thereon high-pressure compressed air equipment (that may include equipment for generating nitrogen) that is connected to the bottom-to-surface connection of the submerged pipe that needs to be emptied (if its ends are both undersea, this activity requires mobilizing a specific flexible hose or "coiled tubing" unit constituted by a steel tube wound onto a storage drum). A string of scrapers is then pushed by the air (or the nitrogen) at high pressure as injected in this way from the surface structure into the underwater pipe, so as to expel the test (or preservation) water present inside it in controlled manner, while adjusting the speed of advance of the scrapers. The pipe it then isolated (from its environment) so as either to be raised to the surface or else to be put directly into production.

The dimensioning of the high-pressure compressed air equipment (and/or nitrogen generation equipment) used for this emptying operation depends on the depth at which the pipes are submerged, and also on their length and their diameter. Specifically, the longer and/or wider the pipe and greater the depth at which it is submerged, the greater the need for air (or nitrogen) that is highly compressed in order to empty out the test water filling such a pipe.

Thus, for applications that are becoming more and more common, in which pipes have lengths of several tens or even hundreds of kilometers and are submerged at great depths (i.e. depths of more than 400 meters (m)), the equipment used on the surface for emptying such pipes needs to be of dimensions suitable for delivering compressed air (or nitrogen) at very high pressures, possibly reaching 200 bars to 250 bars.

Equipment that is dimensioned for emptying such submerged pipes that are submerged at very great depths is therefore very voluminous and bulky; it occupies a large footprint area on the surface that receives it; at present, this area is typically of the order of 800 square meters ($m^2$) to 1200 $m^2$ for equipment that is to deliver compressed air at pressures that may be as great as 200 bars to 250 bars, which means that the speed of advance of the scrapers needs to be greatly restricted, entailing consequences in terms of organizing the scheduling of construction ships. Unfortunately, the space available on surface structures such as FPSO units is by its very nature greatly limited and can make it necessary to have recourse to an additional vessel suitable for receiving such compressed air equipment dedicated to emptying pipes, which ships are themselves limited in terms of available space.

When a construction ship is used, another constraint on operations of emptying pipes submerged at great depths relates to the hose or coiled tubing that connects the compressed air (or nitrogen) equipment to the submerged pipe, which hose needs specifically to be capable of withstanding the hydrostatic crushing inherent to great depths in the event of it becoming depressurized, whether or not depressurization is under control.

OBJECT AND SUMMARY OF THE INVENTION

A main object of the present invention is thus to propose an emptying method that does not present the above-mentioned drawbacks.

In accordance with the invention, this object is achieved by a method of emptying an undersea fluid transport pipe that is submerged and full of water, the method comprising pumping out at least a portion of the water present inside the submerged pipe by means of a submersible pump unit connected to a point of the pipe, the volume of water pumped out from the inside of the pipe being compensated by a gas injected under pressure into the submerged pipe from a point thereof that is situated higher than the point of connection to the submersible pump unit.

The method of the invention is remarkable in particular in that emptying is performed by a submersible pump unit that is submerged and connected to the pipe. This pump unit sucks out the water present inside the pipe in order to discharge it directly into the sea. During pumping, in order to compensate for the loss of volume of water inside the pipe and thus avoid phenomena of cavitation and of the pump unit losing priming that would result therefrom, a gas under pressure (e.g. air or nitrogen) is injected into the pipe from a high point of the pipe (relative to the point where the pump unit is connected to the pipe, which may be in the air or submerged).

Such an emptying method requires an installation that is simple and compact and in particular does not require a neighboring surface structure, if any, to be occupied excessively (100 $m^2$ to 150 $m^2$ instead of 800 $m^2$ to 1200 $m^2$). Specifically, the pump unit is submersible and can be controlled from a simple multi-service vessel (with which it is merely connected by an electric power cable). As for injecting gas in order to compensate for the volume of water pumped out, that may be done by means that are likewise submersible, or else on board the surface structure while occupying only a small amount of space thereon (the pressure needed for injecting gas under such circumstances does not exceed 50 bars, so the dimensions of such an injection unit remain limited.

In an implementation for partially emptying pipes that have been abandoned on the sea bottom at great depths for subsequent recovery it so as to terminate installation, the method further comprises stopping pumping-out the water present inside the submerged pipe on detecting that a predetermined volume of water has been pumped out by the submersible pump unit from upstream and downstream relative thereto, and isolating the submersible pump unit.

In this implementation, the method may further comprise depressurizing the submerged pipe that has been partially emptied to a predetermined pressure to enable it to be used subsequently as a permanent bottom-to-surface connection pipe, once installation has been terminated.

When the high point of the pipe for emptying is close to a surface structure, gas may be injected under pressure into the submerged pipe from a set of low-pressure compressors and nitrogen generator units that is installed on a surface structure and that is connected to the high point of the pipe by a hose.

Alternatively, when the high point of the pipe for emptying is remote from any surface structure (or when the surface structure cannot receive equipment dedicated to injecting gas), gas may be injected under pressure into the submerged pipe from a submersible set of cylinders of nitrogen under high pressure, which set is placed on the sea bottom and connected to the high point of the pipe by a hose.

In this implementation, gas may be injected into the submerged pipe at an estimated relative pressure lying in the range 1 bar to 5 bars.

In another implementation for totally and definitively emptying the submerged pipe, the method comprises:

launching scrapers inside the submerged pipe from a high point and from a low point thereof, pushing the scrapers towards each other by gas that is injected under pressure into the inside of the pipe;

pumping out the water present inside the submerged pipe by means of a submersible pump unit connected to a point of the pipe that is situated between its high and low points, the volume of water pumped out from the inside of the pipe being compensated by the gas that is injected under pressure into the pipe;

on detecting the presence of one of the scrapers at a predetermined distance from the submersible pump unit, stopping the injection of gas pushing said scraper and beginning depressurization of said pipe from the point of the pipe from which said scraper was launched; and on detecting the presence of the other scraper at a predetermined distance from the submersible pump unit, stopping the pump unit and isolating it from the pipe, with total emptying of the pipe being obtained by continuing to inject gas under pressure so as to push the scrapers.

In this implementation, the combined pressurization and depressurization of the pipe preferably continue until the scrapers are recovered. Furthermore, the scrapers may be launched into the inside of the submerged pipe from at least one surface structure (an FPSO and/or an offshore platform) having installed thereon a set of low-pressure compressors and nitrogen generator units.

In this implementation, gas may be injected into the submerged pipe in order to push the scrapers at a relative pressure lying in the range 5 bars to 50 bars.

The invention also provides an installation for performing the method as defined above, the installation comprising a submersible pump unit that is deployed and controlled by a multi-service vehicle and means for injecting gas under pressure.

The means for injecting gas under pressure may comprise at least one set of low-pressure compressors and nitrogen generator units installed on at least one surface structure. Alternatively, these means for injecting gas under pressure may comprise a submersible set of cylinders of nitrogen at high pressure, which set is deployed by the multi-service vehicle.

BRIEF DESCRIPTION OF THE DRAWINGS

Other characteristics and advantages of the present invention appear from the following description made with reference to the accompanying drawings, which show embodiments having no limiting character. In the figures.

DETAILED DESCRIPTION OF THE INVENTION

The invention relates to (partially or completely) emptying any undersea pipe that is submerged and used for transporting fluid (gas or liquid), which pipe is submerged and full of water.

Figure 1A:
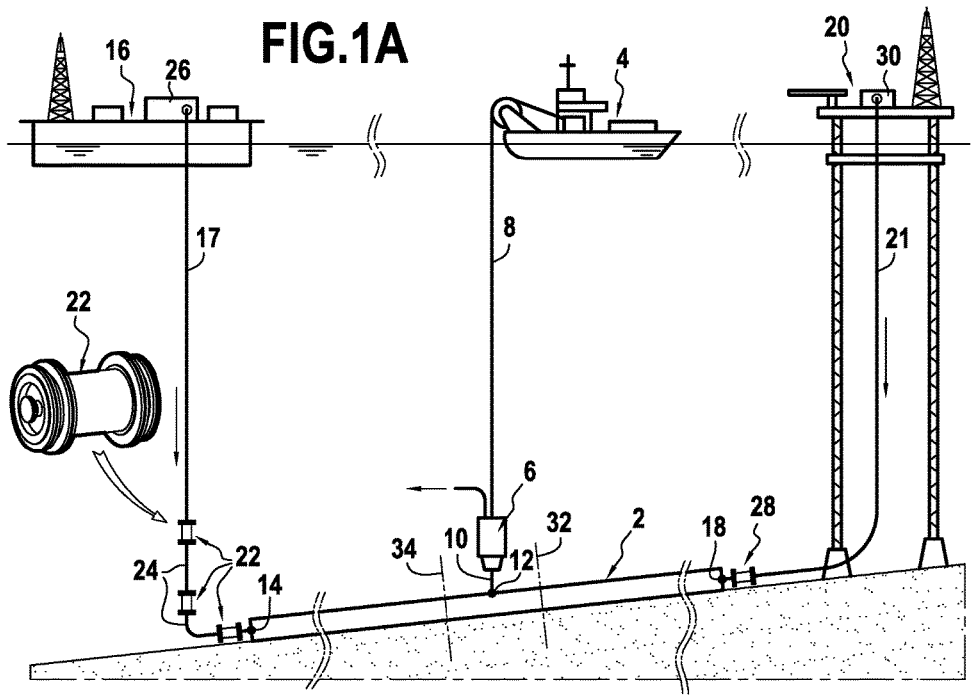
FIGS. 1A to 1C show various steps of the emptying method in an implementation of the invention.
Figure 1B:
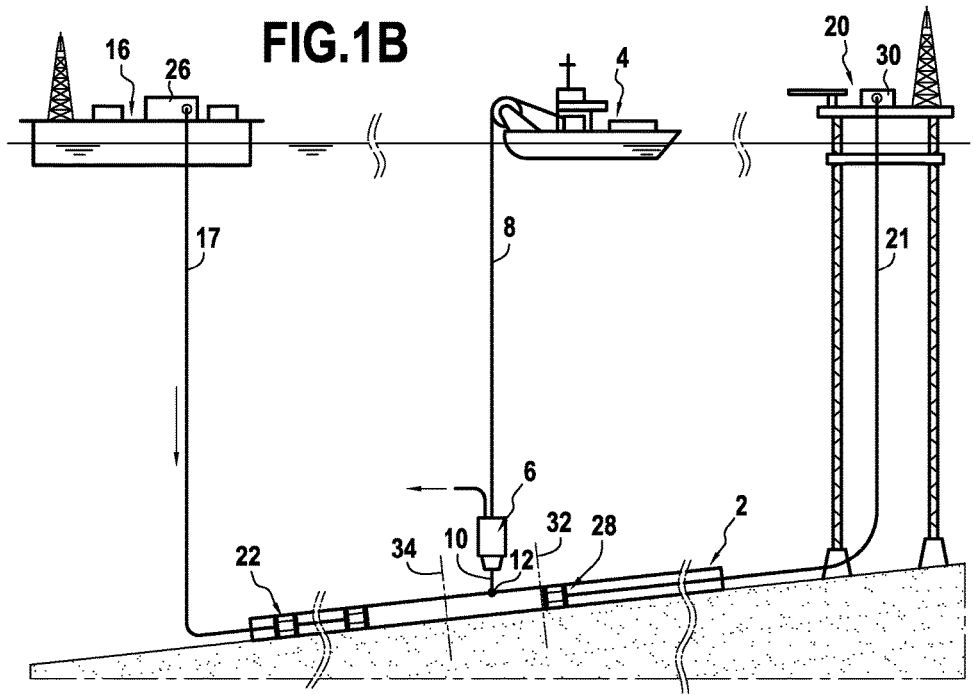
Figure 1C:
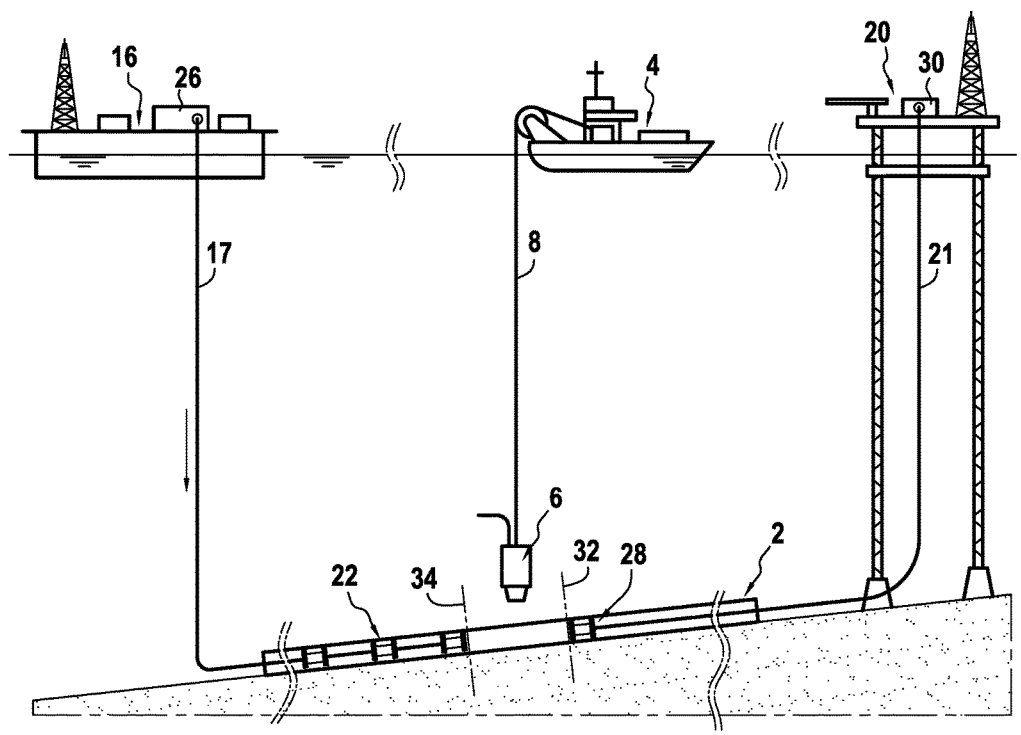

FIGS. 1A to 1C show in highly diagrammatic manner various steps in performing the method in a first implementation of the invention in order to empty completely and definitively a pipe 2 that is resting on the sea bottom and that is full of water.

The pipe 2 for emptying may have a length of a few kilometers to several hundreds of kilometers and it may lie in depths that may be anywhere between the surface and as much as 3000 m.

Prior to being emptied, the pipe 2 may have been subjected to testing, in particular in terms of leak testing and ability to withstand pressure. Once those test operations have been performed, it is then necessary to empty the submerged pipe of its test water so as to put it into production or so as to recover one of its ends from the sea bottom.

For this purpose, the method of the invention makes provision for deploying a submersible pump unit 6 on the sea bottom from a multiservice ship (MSV) 4 that is positioned on the surface in the immediate proximity of the pipe that is to be emptied.

The pump unit 6 is connected to the MSV 4 by an electric power cable 8 and it is controlled thereby in order to connect itself via a hose 10 (or loading arm) to the pipe 2 via the first available connection point 12 thereon. Such a connection operation is frequently used in the field of the offshore oil industry, and it is therefore not described in detail.

The pump unit 6 is a submersible unit, e.g. having one or more centrifugal and/or positive displacement type pumps that operate in this example by sucking water out of the pipe and discharging it directly into the sea. The flow rate may lie in the range 50 cubic meters per hour ($m^3/h$) to 1000 $m^3/h$.

By way of example, the pump unit may be the same as the unit usually used for filling and scraping pipes in deep water by maintaining a certain speed of advance for the scrapers (i.e. the pump unit is used for sucking in water from above the level of the sea bottom and injecting it into the pipe in order to push the scrapers), but operating in reverse.

Furthermore, the lowest point 14 of the pipe 2 for emptying (i.e. the deepest point) is connected to a first surface structure 16, e.g. an FPSO unit via a first line 17 (a bottom-to-surface connection).

Likewise, the highest point 18 of the pipe 2 for emptying (i.e. its point closest to the surface) is connected to a second surface structure 20, e.g. an offshore platform, via a second line 21 (bottom-to-surface connection).

These operations of connecting the submerged pipe to surface structures are used frequently in the field of the offshore oil industry and they are therefore not described in detail.

The emptying method then makes provision for launching a string of scrapers 22 (also known as "pigs"), inside the submerged pipe from the first surface structure 16 that is connected to its low point 14.

Such scrapers are typically used for cleaning pipes when there are solid deposits (such as paraffin or hydrates) by acting in highly energetic and repeated manner but without damaging the inside surfaces of the pipes, or else they are used for separating different fluids.

In the implementation of FIGS. 1C to 1C, this string of scrapers comprises three scrapers 22 that are spaced apart from one another by buffers of fresh water 24 (optionally together with monoethylene glycol (MEG) or any other hydrophilic fluid that is commonly used as a replacement for MEG, depending on the needs of the project) in order to desalinate and condition the line at a dew point equivalent to or lower than −20° C. at atmospheric pressure in the pipe 2 for emptying as they pass along its inside.

The string of scrapers 22 is pushed inside the pipe 2 (from its low point 14 towards its high point 18) by injecting compressed gas (air or nitrogen) behind the string from the first surface structure 16. For this purpose, when using nitrogen, the first surface structure has a set 26 of low-pressure compressors and nitrogen generator units connected to the first line 17 in order to inject nitrogen at a pressure typically lying in the range 1 bar to 50 bars after the scrapers 22.

In the same manner, the emptying method of the invention makes provision for launching a scraper 28 inside the submerged pipe 2 from the second surface structure 20 that is connected to the high point 18 of the pipe.

This scraper 28 is then pushed into the inside of the pipe towards its low point 14 by injecting compressed gas (air or nitrogen) into the second line 21 behind the scraper. For this purpose, when using nitrogen, the second surface structure 20 also has a set 30 of low-pressure compressors and nitrogen generator units connected to the second line 21 in order to inject nitrogen at a pressure typically lying in the range 1 bar to 50 bars behind the scraper 28.

Once the scrapers 22 and 28 have been launched into the inside of the pipe in opposite directions, the pump unit 6 connected to the pipe 2 at a connection point 12 situated between its low point 14 and its high point 18 is activated.

The water present in the pipe 2 is sucked out by the pump unit 6 and discharged directly into the sea. During this operation, the same pressure is maintained at both ends of the pipe (i.e. from its low point 14 and its high point 18 by the sets 26 and 30 of low-pressure compressors and nitrogen generator units) so as to compensate for the loss of the volume of water that has been sucked out, thereby avoiding any phenomenon of cavitation and of the pump unit losing its priming.

Once one of the scrapers launched into the inside of the pipe is detected as being at a predetermined distance (e.g. lying in the range 200 m to 500 m) from the connection point 12 between the pump unit 6 and the pipe, the method of the invention makes provision for stopping the injection of gas pushing that scraper and for beginning to depressurize the downstream portion of the pipe from the corresponding end thereof.

Thus, in the example shown in FIG. 1B, the scraper 28 that was launched from the second surface structure 20 is detected as being located at a point 32 in the pipe that is situated at a predetermined distance from the connection point 12 between the pump unit 6 and the pipe. This detection may be performed by way of example by means of ultrasound or electromagnetic emitters (or indeed using a radioactive source) incorporated in each of the scrapers and that are located by means of remotely operated vehicles (ROVs) of the ship that are fitted with receivers specific to the type of emitter used.

Following this detection, the set 30 of low-pressure compressors and nitrogen generator units installed on the second surface structure 20 is deactivated to stop the scraper advancing, and depressurization begins from the high point 18 of the pipe.

The pump unit 6 continues to suck out the water present inside the pipe 2 so long as the other scrapers 22 launched from the first surface structure 16 have not been detected as being present at a predetermined distance (e.g. likewise lying in the range 200 m to 500 m depending on a bathymetric study of the pipe) from the connection point 12 between the pump unit and the pipe.

As soon as the first scraper 22 of the string of scrapers launched from the first surface structure 16 reaches a point 34 of the pipe that is situated at a predetermined distance from the connection point 12 (FIG. 1C), the pump unit 6 is stopped, is isolated from the system, and is recovered by the MSV 4 on its deck.

During this operation, emptying of the pipe 2 continues by continuing to inject gas under pressure from the first surface structure 16, while maintaining depressurization of the pipe from the second surface structure 20. Emptying of the pipe thus continues until the scrapers 22 and 28 are recovered by the second surface structure. The pipe is then completely emptied of its test water and instead it is filled with nitrogen or compressed air, and it is potentially conditioned to have a dew point to −20 C. at atmospheric pressure.

Figure 2:
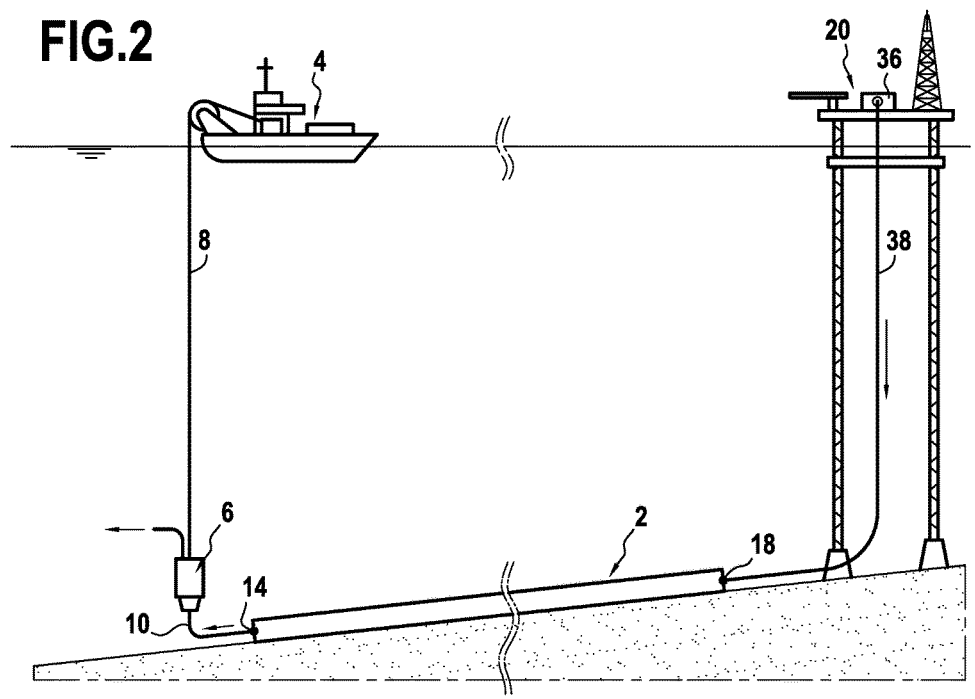
FIG. 2 shows the steps of the emptying method in another implementation of emptying.
Figure 3:
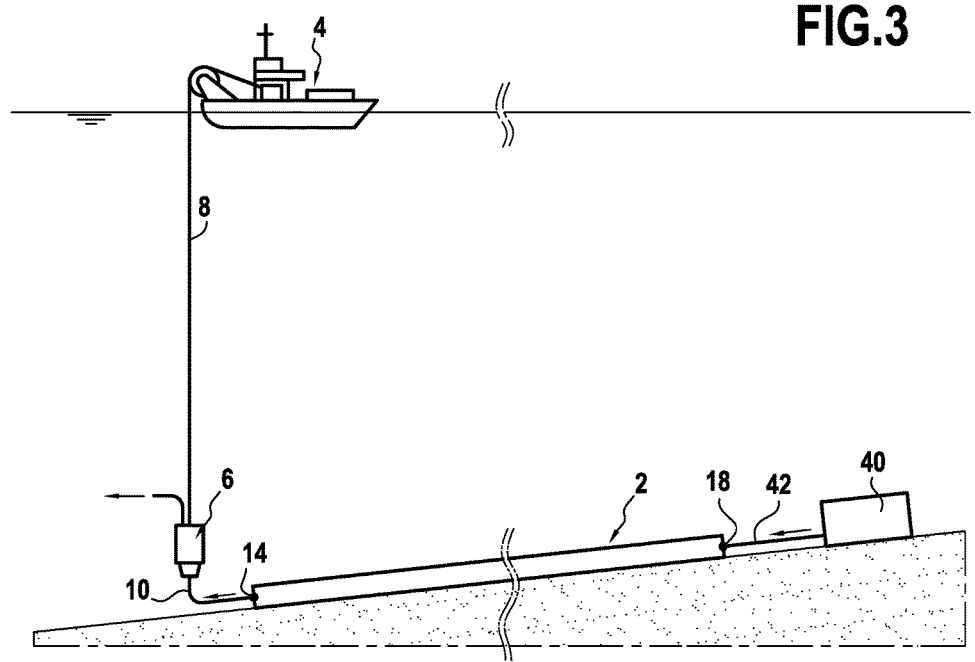
FIG. 3 shows the steps of the emptying method in a variant of the FIG. 2 implementation.

FIGS. 2 and 3 show the steps of another implementation of a method for partially emptying a pipe 2 resting on the sea bed and that has been filled with water.

The emptying method in this other implementation is similar to that described with reference to FIGS. 1A to 1C, i.e. it consists in pumping out a portion of the water present inside the submerged pipe using a submersible pump unit connected to a point of the pipe, with the volume of water that is pumped out from the inside of the pipe being compensated by a volume of gas that is injected under pressure into the submerged pipe from a point thereof that is situated higher than the connection point to the submersible pump unit. The method may be performed with or without a scraper preloaded into the high end 18 (a decision that depends on the bathymetric profile of the pipe, in particular on the presence of one or more local low points).

The method shown in FIG. 2 applies more particularly to a configuration in which the high point of the pipe 2 for emptying (or the first connection point closest to its high point 18) is close to a surface structure 20 that can receive the additional equipment required for this operation, typically an offshore platform.

In this configuration, the MSV 4 deploys the submersible pump unit 6 on the sea bottom and connects it to the pipe 2 at its low point 14 (or at the first connection closest to the low point) by means of a hose 10 (or a loading arm). The pump unit 6 is powered and controlled directly from the MSV 4 via the electric power cable 8.

Gas under pressure is introduced into the submerged pipe 2 from a set 36 of low-pressure compressors and nitrogen generator units that is installed on the surface structure 20 and that is connected to the high point 18 of the pipe by a hose 38.

Once the pre-requisite tests have been performed, a team present on the surface structure 20 activates the set 36 of low-pressure compressors and nitrogen generator units in order to compensate for the loss of volume of water with a volume of nitrogen at a relative pressure typically lying in the range 1 bar to 5 bars (but that may possibly go up to 50 bars, should that be necessary).

The MSV 4 then activates the pump unit 6, which empties the pipe (the water that is pumped out being discharged directly into the sea) until its meter indicates that a predetermined volume of water has been pumped out corresponding to a predetermined value for residual water column in the pipe (e.g. lying in the range 20 m to 30 m). The pump unit 6 is then stopped and the MSV isolates it from the system before recovering it on its deck.

The set 36 of low-pressure compressors and nitrogen generator units is used by the personnel present on the surface structure to depressurize the partially emptied pipe 2 to a predetermined pressure in order to enable the pipe to be recovered by a pipe-laying vessel in controlled and safe manner.

The method shown in FIG. 3 is a variant of the method described above in which the high point of the pipe 2 for emptying (or the first connection point closest to the high point 18 thereof) is far away from any surface structure (or if the surface structure cannot receive the additional equipment needed for this operation).

In this variant implementation, gas under pressure is introduced into the submerged pipe 2 from a submersible set 40 of high-pressure nitrogen cylinders of "marine" quality (or from a specially fabricated pressurized appliance, depending on the required volume) that is placed on the sea bottom and connected to the high point 18 of the pipe by a hose 42 (or by a loading arm).

More precisely, this set 40 of nitrogen cylinders is previously placed on the sea bottom and connected to the point 18 of the pipe, e.g. by using the MSV 4. It constitutes a submersible set that is adapted to great depths and that has cylinders containing nitrogen at very high relative pressure (typically of the order of 200 bars to 300 bars). These cylinders are interconnected with the hose 42 via a specific regulator/expander that has previously been rated on the surface to an appropriate relative pressure, typically lying in the range 1 bar to 5 bars. The hose 42 (or loading arm), is naturally capable of withstanding crushing as generated by the water column.

Once the pre-requisite tests have been performed, the MSV 4 activates the pump unit 6, which empties the pipe (with the pumped-out water being discharged directly into the sea) until its meter indicates that a predetermined volume of water has been pumped out corresponding to a predetermined value for residual water column in the pipe (e.g. lying in the range 20 m to 30 m).

During this operation, the volume of water pumped from the inside of the pipe 2 is compensated by nitrogen coming from the set 40 at a relative pressure of 1 bar to 5 bars. No particular action is necessary under such circumstances, with filling by nitrogen taking place automatically via the previously-rated regulator/expander.

The pump unit 6 is then stopped and the MSV 4 isolates it from the system prior to recovering it on deck. The MSV returns to the other end of the pipe in order to isolate the set 40 of nitrogen cylinders prior to likewise recovering it on deck.

The invention claimed is:

1. A method of emptying an undersea fluid transport pipe that is submerged and full of water, the method comprising pumping out at least a portion of the water present inside the submerged pipe by a submersible pump unit connected to a point of the pipe, the volume of water pumped out from the inside of the pipe being compensated by a gas injected under pressure into the submerged pipe from a point situated higher than the connection point to the submersible pump unit, the method comprises:
    launching scrapers inside the submerged pipe from a high point and from a low point thereof, pushing the scrapers towards each other by gas that is injected under pressure into the inside of the pipe;
    pumping out the water present inside the submerged pipe by a submersible pump unit connected to a point of the pipe situated between the high and low points, the volume of water pumped out from the inside of the pipe being compensated by the gas that is injected under pressure into the pipe;
    on detecting the presence of one of the scrapers at a predetermined distance from the submersible pump unit, stopping the injection of gas pushing said scraper and beginning depressurization of said pipe from the point of the pipe from which said scraper was launched; and
    on detecting the presence of the other scraper at a predetermined distance from the submersible pump unit, stopping the pump unit and isolating the pump unit from the pipe, with total emptying of the pipe being obtained by continuing to inject gas under pressure so as to push the scrapers.

2. The method according to claim 1, wherein combined pressurization and depressurization of the pipe continue until the scrapers are recovered.

3. The method according to claim 1, wherein the scrapers are launched into the inside of the submerged pipe from at least one surface structure having installed thereon a set of low-pressure compressors and nitrogen generator units.

4. The method according to claim 1, wherein gas is injected into the submerged pipe in order to push the scrapers at a relative pressure lying in the range 5 bars to 50 bars.

5. The method according to claim 1, wherein the submersible pump unit connected to a point of the pipe by means of an MSV and is connected thereto by an electric power cable.

6. An installation for performing the method according to claim 1, the installation comprising a submersible pump unit that is deployed and controlled by an MSV and means for injecting gas under pressure.

7. The installation according to claim 6 wherein the means for injecting gas under pressure comprise at least one set of low-pressure compressors and nitrogen generator units installed on at least one surface structure.

8. The installation according to claim 6, wherein the means for injecting gas under pressure comprise a submersible set of cylinders of nitrogen at high pressure, which set is deployed by the MSV.

\* \* \* \* \*